(12) United States Patent
Gasparini et al.

(10) Patent No.: US 8,474,803 B2
(45) Date of Patent: Jul. 2, 2013

(54) ROTARY SHAFT FLEXURAL VIBRATION DAMPING DEVICE

(75) Inventors: Giuseppe Gasparini, Samarate (IT); Francesco Grisostolo, Samarate (IT); Diego Scaltritti, Samarate (IT)

(73) Assignee: Agustawestland S.p.A., Samarate (IT)

( * ) Notice: Subject to any disclaimer, the term of this patent is extended or adjusted under 35 U.S.C. 154(b) by 35 days.

(21) Appl. No.: 13/208,872

(22) Filed: Aug. 12, 2011

(65) Prior Publication Data
US 2012/0088590 A1   Apr. 12, 2012

(30) Foreign Application Priority Data

Aug. 12, 2010 (EP) .................................... 10425279

(51) Int. Cl.
*F16C 27/04* (2006.01)
(52) U.S. Cl.
USPC .......................... 267/140.5; 248/638; 384/535
(58) Field of Classification Search
USPC .................. 464/180; 267/140.11, 140.5, 174, 267/286–289; 248/560, 638, 645, 671, 267/676–678; 384/218, 535, 581; 244/60; 73/452; 180/381
See application file for complete search history.

(56) References Cited

U.S. PATENT DOCUMENTS

| 133,952 | A | * | 12/1872 | Quirk ........................ 267/289 X |
| 2,674,330 | A | * | 4/1954 | Feil, Jr. ......................... 180/381 |
| 2,869,936 | A | * | 1/1959 | Federn | |
| 7,682,085 | B2 | * | 3/2010 | Thelen et al. | |
| 7,771,126 | B2 | * | 8/2010 | Faass et al. .................... 384/535 |

FOREIGN PATENT DOCUMENTS

| FR | 2908736 | 5/2008 |
| JP | 2097742 | 4/1990 |

* cited by examiner

*Primary Examiner* — Gregory Binda
(74) *Attorney, Agent, or Firm* — McCracken & Frank LLC

(57) ABSTRACT

A damping device for damping flexural vibration of a shaft rotating about a first axis, the device having: a supporting body; and a member, which defines an annular opening fitted through with the shaft, and is movable, with respect to the supporting body and radially with respect to the first axis, between a first and a second position when the shaft flexes radially with respect to the first axis. The member is set to the first position, and the opening is traversed loosely by the shaft when the rotation speed of the shaft is within a first range; the member is set to the second position, and the opening cooperates with the shaft, when the rotation speed of the shaft is within a second range differing from the first range and including at least one critical speed of the shaft; and the damping device has elastic means interposed between the supporting body and the member.

10 Claims, 5 Drawing Sheets

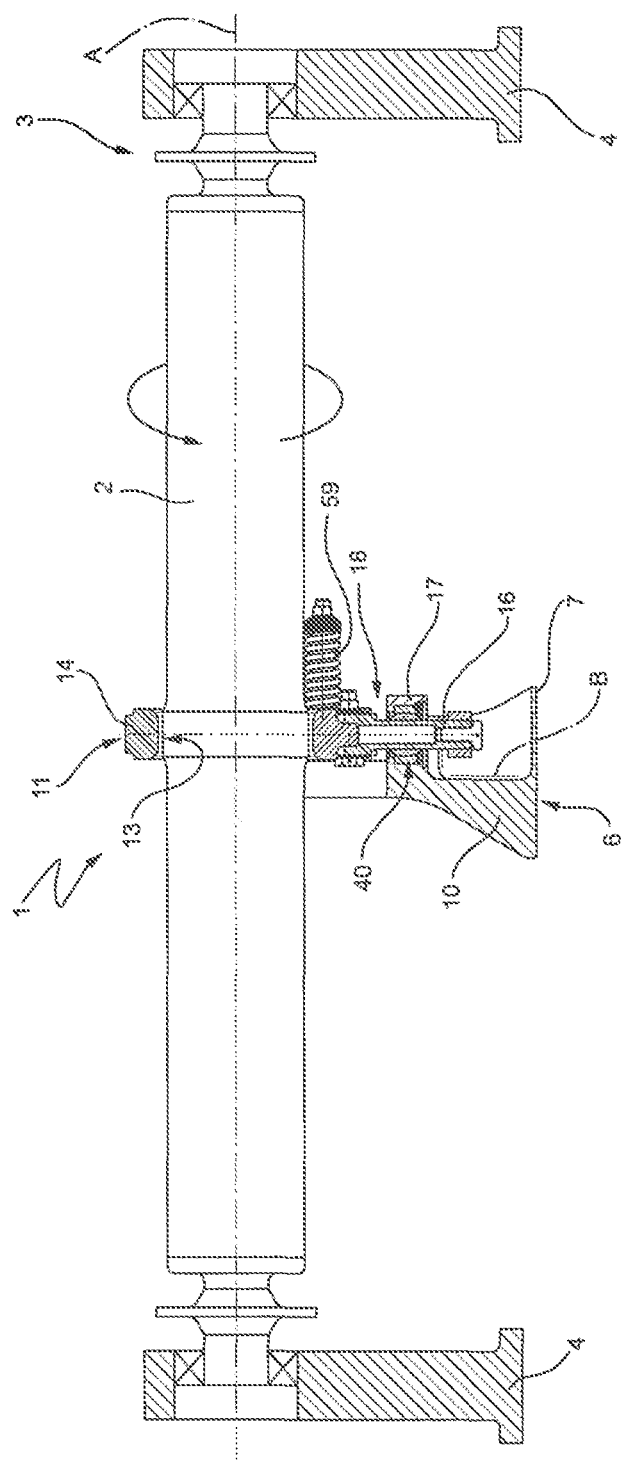

ROTARY SHAFT FLEXURAL VIBRATION DAMPING DEVICE

The present invention relates to a rotary shaft flexural vibration damping device.

BACKGROUND OF THE INVENTION

As is known from vibration mechanics, shafts rotating about an axis are subject to flexural vibration, i.e. vibrate radially with respect to the rotation axis of the shaft, and vibrate most when rotating at critical speed.

To enable shafts to function properly even above critical speeds, damping devices are used to absorb the flexural energy of the shaft when it reaches critical speed.

Damping devices are also designed to maintain acceptable radial displacement of the shaft and so prevent damage, and to stabilize flexural vibration of the shaft.

More specifically, damping devices are known which substantially comprise a fixed supporting body; and a ring defining an annular opening the shaft fits through.

When rotating outside the critical flexural vibration speed range, the shaft fits loosely through the opening.

In other words, the shaft does not contact the ring.

Conversely, flexural vibration of the shaft at critical speed brings the shaft into contact with the ring.

Contact between the shaft and the ring first alters the natural frequency and overall rigidity of the shaft, and eventually results in dissipation of heat caused by sliding friction between the shaft and the damping device ring; which sliding friction opposes rotation and flexural vibration, and alters the dynamics, of the shaft.

As a result of the above two phenomena, the damping device opposes any increase in flexural vibration, and so absorbs the energy associated with displacement of the shaft.

A need is felt within the industry to damp flexural vibration of the shaft at critical shaft rotation speeds, while at the same time minimizing friction between the shaft and the damping device at rotation speed which are different from critical shaft rotation speeds.

A need is also felt to reduce the response time of the damping device.

SUMMARY OF THE INVENTION

It is an object of the present invention to provide a device for damping flexural vibration of a shaft, and which achieves at least one of the above goals in a straightforward, low-cost manner.

According to the present invention, there is provided a clamping device for dampening flexural vibration of a shaft rotating about a first axis.

BRIEF DESCRIPTION OF THE DRAWINGS

A preferred, non-limiting embodiment of the present invention will be described by way of example with reference to the accompanying drawings, in which:

FIG. 5 shows a section, with parts removed for clarity, of a drive comprising a shaft and the FIG. 1-4 damping device.

DETAILED DESCRIPTION OF THE INVENTION

Figure 1:
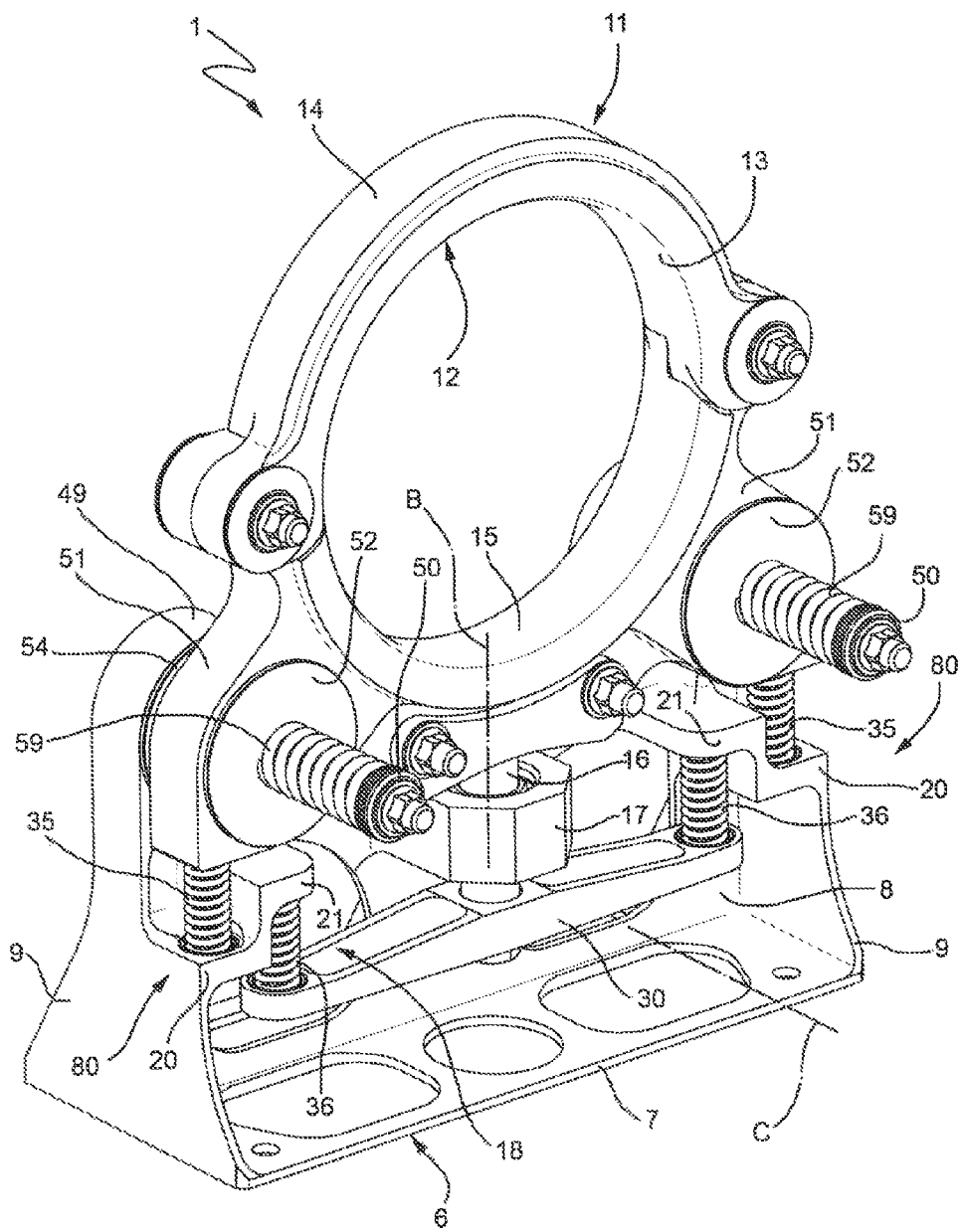
FIG. 1 shows a view in perspective of a damping device in accordance with the present invention.

Number 1 in FIG. 1 indicates a damping device for damping flexural vibration of a shaft 2 rotating about an axis A.

More specifically, flexural vibration occurs in a plane radial with respect to axis A, i.e. in a plane orthogonal with respect to axis A.

Device 1 is designed to be incorporated in a drive 3, of which FIG. 5 shows only shaft 2, device 1, and two bearings 4 supporting shaft 2 to rotate about axis A.

Drive 3 preferably forms part of an aircraft, in particular a helicopter or a convertiplane.

Device 1 substantially comprises:
- a supporting body 6 fixed to bearings 4 in a manner not shown in the drawings; and
- a ring 11, which defines an opening 12 fitted through with shaft 2, and is movable, radially with respect to axis A, between a first and second position.

More specifically, opening 12 is circular and bounded by a profile 13.

Shaft 2 operates in two ranges, depending on the rotation speed and, therefore, the amount of flexural vibration of shaft 2.

In a first operating range, the rotation speed of shaft 2 falls within a first range not including the critical speeds of shaft 2.

In the first rotation speed range, shaft 2 rotates loosely inside opening 12, and ring 11 is set to the first position.

In other words, flexural vibration of shaft 2 is not enough to bring shaft 2 into contact with profile 13 of opening 12.

In a second operating range, the rotation speed of shaft 2 falls within a second range differing from the first and including the critical speeds of shaft 2.

When shaft 2 rotates in the second speed range, the outer profile of shaft 2 contacts profile 13 of opening 12 and moves ring 11 into the second position.

In other words, the amount of flexural vibration is sufficient to bring the outer profile of shaft 2 into contact with profile 13 of opening 12.

More specifically, supporting body 6 comprises, integrally:
- a bottom wall 7 substantially parallel to and spaced apart from axis A;
- a crosspiece 8 projecting substantially perpendicularly from bottom wall 7 towards ring 11; and
- two substantially parallel sides 9 projecting towards ring 11 from opposite edges of bottom wall 7, and substantially perpendicular to bottom wall 7.

Supporting body 6 also comprises:
- a trapezoidal rib 10 (FIGS. 3 and 5) interposed between bottom wall 7 and one side of crosspiece 8; and
- an appendix 17 (FIGS. 1, 2, 3) projecting from crosspiece 8, on the opposite side to rib 10.

Device 1 advantageously comprises elastic means 18 interposed between supporting body 6 and ring 11.

More specifically, ring 11 substantially comprises:
- two, respectively top and bottom, half-rings 14, 15, which fit together to define opening 12; and
- a pin 16, which projects from half-ring 15, is elongated along an axis B crosswise to axis A, and, in the example shown, is positioned vertically.

Half-rings 14, 15 are connected releasably to each other at respective circumferential ends.

Pin 16 extends loosely through appendix 17, and axis B is radial, i.e. perpendicular, with respect to axis A when ring 11 is in the first position.

Figure 4:
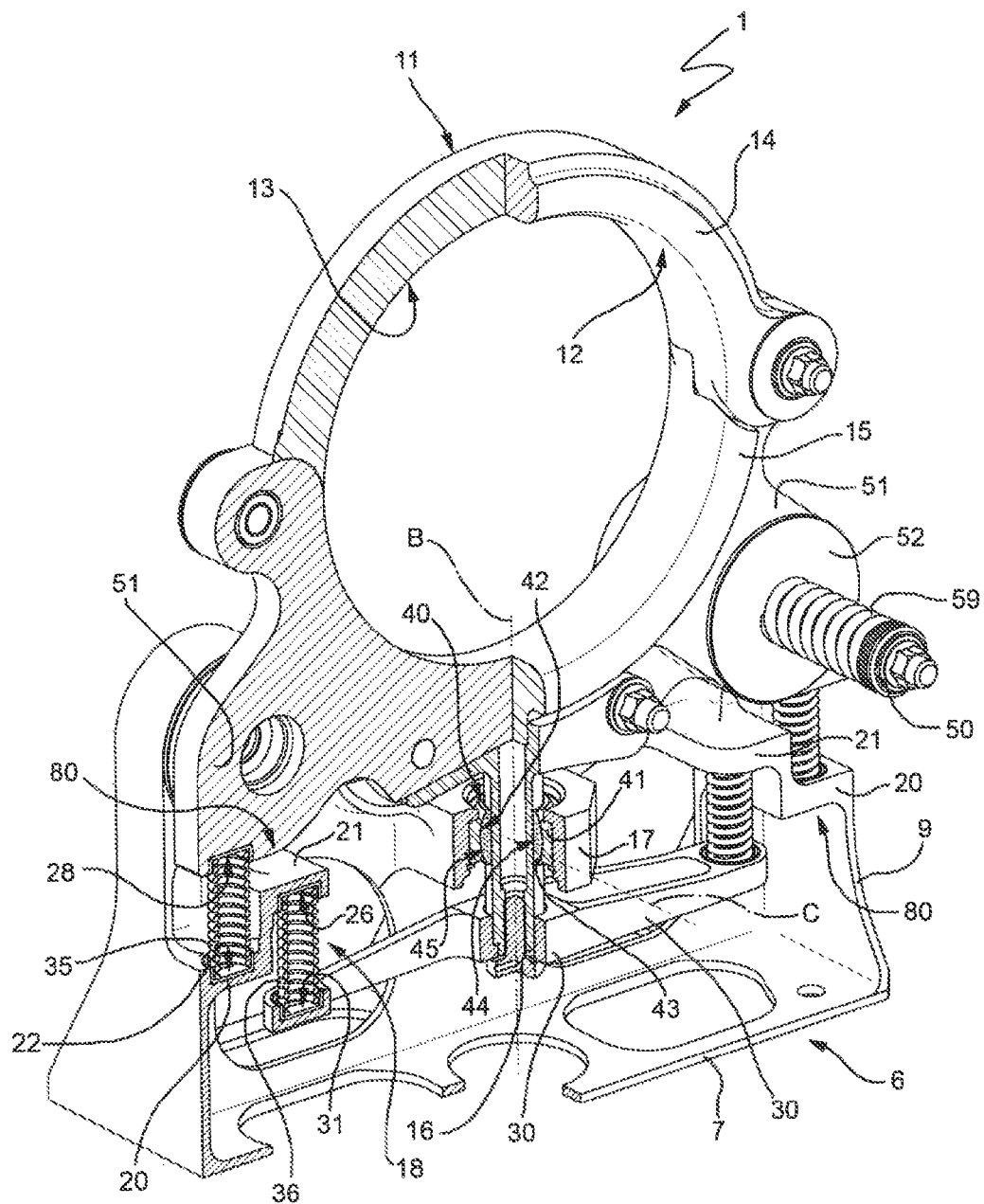

Pin 16 comprises a first end fitted integrally to half-ring 15; and a second end opposite the first end and facing bottom wall 7 (FIG. 4).

Supporting body 6 comprises two appendixes 80 (FIG. 4) interposed between respective sides 9 and rib 10.

More specifically, each appendix 80 comprises a horizontal portion 20 projecting from a respective side 9 and defining a first circular seat with an axis parallel to axis B;

a horizontal portion 21 connected to rib 10 and defining a second circular seat with an axis parallel to axis B; and a vertical portion interposed between portions 20 and 21.

As shown in FIG. 4, portions 21 are interposed between portions 20.

The first seats of portions 20 and the second seats of portions 21 define respective shoulders 22, 26.

Half-ring 15 comprises two projections 51 projecting from the bottom of half-ring 15, on the opposite side to half-ring 14.

Projections 51 define respective shoulders 28 (FIG. 4) opposite respective first seats defined by corresponding portions 20.

Supporting body 6 also comprises a plate 30 integral with pin 16 and defining two circular shoulders 31.

Plate 30 projects from the second end of pin 16, and is substantially perpendicular to pin 16.

More specifically, shoulders 31 are parallel to axis B and vertically face respective shoulders 26.

Elastic means 18 comprise:
two springs 35, each interposed between a respective shoulder 28 and a respective shoulder 22; and
two springs 36, each interposed between a respective shoulder 26 and a respective shoulder 31.

Springs 35, 36 extend parallel to axis B and, in the example shown, are coil springs.

Springs 36 are interposed between springs 35.

Springs 35, 36 load ring 11 into the first position. More specifically, springs 35, 36 are loaded to exert respective equal, opposite forces F1, F2 on pin 16, and therefore on shaft 2, when shaft 2 exerts no force on ring 11, i.e. when shaft 2 rotates within the first speed range.

Figure 2:
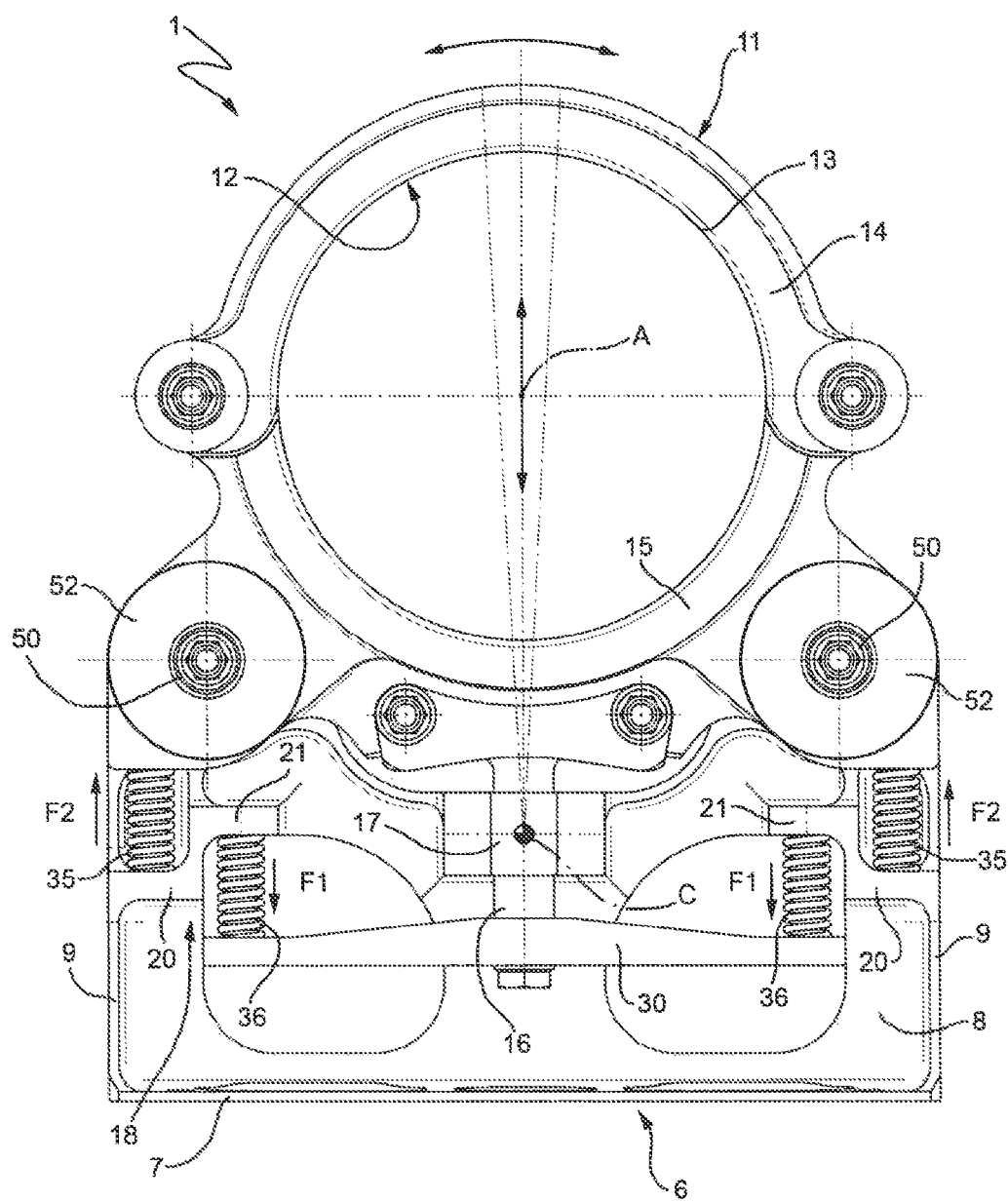
FIG. 2 shows a front view of the FIG. 1 damping device.

As shown in FIG. 2, force F2 is directed from shoulder 22 to shoulder 28.

Force F1 is directed from shoulder 26 to shoulder 31.

Forces F1, F2 are parallel to axis B.

Conversely, when rotating in the second speed range, shaft 2 exerts force on ring 11, thus unbalancing forces F1, F2.

When the rotation speed of shaft 2 returns to the first range, springs 35, 36 push pin 16, and therefore ring 11 integral with pin 16, elastically along axis B towards shaft 2.

More specifically, springs 35, 36 are loaded just enough to overcome the friction force braking ring 11 and pin 16.

Appendix 17 houses an articulated joint 40 fitted through with pin 16, and which allows pin 16, and therefore ring 11, to rotate about an axis C parallel to axis A.

More specifically, articulated joint 40 (FIG. 4) comprises:
a member 41, which is housed inside a seat defined by appendix 17, and has a surface 42 in the shape of a spherical surface portion; and
a member 43, which defines a through hole 44 fitted through with pin 16, and has a surface 45 cooperating with surface 42.

Surface 45 is in the shape of a spherical surface portion.

Member 41 is fixed inside appendix 17, while member 43 is allowed to rotate with respect to member 41 about axis C.

Device 1 also comprises (FIG. 1):
two pins 50, which are screwed at the ends inside respective walls 49 of supporting body 6, extend loosely through respective projections 51 of ring 11, and project from projections 51 in a direction parallel to axes A and C;
two disk-shaped plates 52 fitted through coaxially with respective pins 50 and fixed with respect to supporting body 6; and
two springs 59, each interposed between a respective pin 50 and a respective plate 52.

Walls 49 are annular in shape, and each extend between a respective side 9 and crosspiece 8.

Springs 59 are coil springs in the example shown, and extend parallel to axes A and C.

Figure 3:
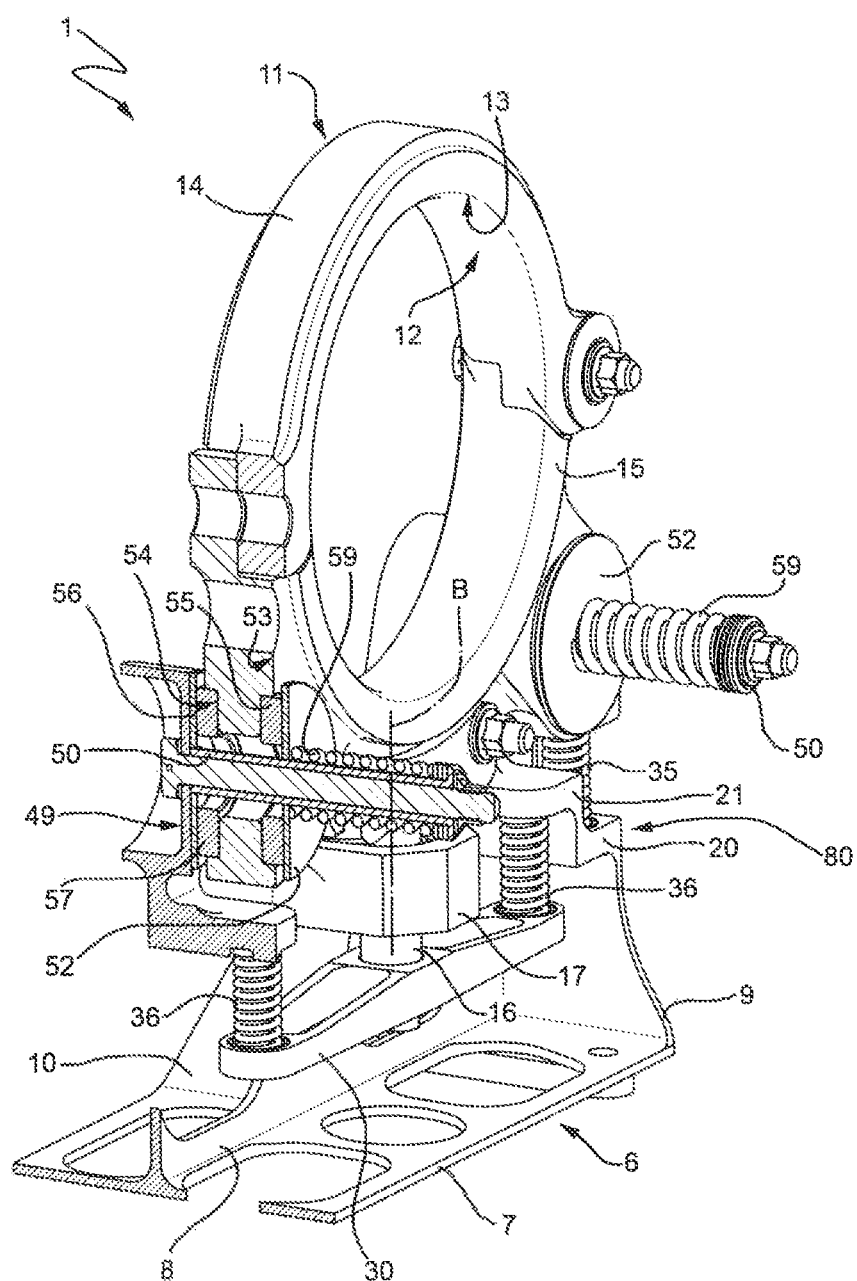
FIGS. 3 and 4 show views in perspective, with parts removed for clarity, of the FIGS. 1 and 2 damping device.

With reference to FIG. 3, each projection 51 is substantially cylindrical, and is bounded axially by a first face 53 and an opposite second face 54.

Face 53 of each projection 51 faces and is located a given distance from relative plate 52, and face 54 of each projection 51 faces and is located a given distance from relative wall 49.

Each face 53 comprises an annular seat engaged by a disk-shaped washer 55 that cooperates in sliding manner with relative plate 52.

Each face 54 comprises an annular seat engaged by a disk-shaped washer 57 that cooperates in sliding manner with a washer 56 integral with relative wall 49.

Springs 59 load respective plates 52 against respective washers 55, and washers 57 against washers 56, to increase sliding friction between washers 55 and plates 52, and between washers 57 and 56, when pin 16 slides along axis B (FIG. 3).

Operation of device 1 is shown starting from a condition in which shaft 2 rotates in the first speed range, i.e. below or above the critical speeds of the shaft.

In this condition, there is little flexural vibration of shaft 2, which therefore extends loosely through profile 13 of opening 12.

Springs 35, 36 exert respective equal, opposite forces F1, F2 on pin 16 and, therefore, ring 11.

When shaft 2 rotates in the second speed range, i.e. nears or reaches one of its critical speeds, the flexural vibration of shaft 2 is sufficient to bring it into contact with profile 13.

Flexural vibration of shaft 2 (FIG. 2) causes:
ring 11 and, therefore, pin 16 to slide along axis B, inside hole 44; and
ring 11 and, therefore, pin 16 and plate 30 to oscillate about axis C defined by articulated joint 40, so the centre of opening 12 is offset with respect to axis A.

The centre of opening 12 is offset with respect to axis A, due to the radial plane to axis A, in which flexural vibration is most severe, varying periodically along an ideal cylinder centred about axis A.

The centre of opening 12 therefore periodically describes a circle centred about axis A.

In other words, pin 16 slides along axis B, and axis B of pin 16 oscillates about axis C.

Slide of pin 16 along axis B is opposed by the sliding friction between washers 55, 57 integral with pin 16, and plates 52 and washers 56 integral with supporting body 6.

This sliding friction opposes movement of ring 11 along axis B, and damps flexural vibration of shaft 2, which thus rotates stably about axis A.

In this condition, forces F1, F2 are therefore no longer equal, and the difference between them equals the force exerted by shaft 2 on ring 11 and, therefore, on pin 16.

When the rotation speed of shaft 2 returns to the first range, springs 35, 36 spring back to their respective loaded positions.

Pin 16 is therefore pushed away from bottom wall 7, and ring 11 returns to the first position.

Springs 35, 36 also rotate pin 16 about axis C into a position in which axis B is perpendicular to axis A, and the centre of opening 12 is once more located along axis A.

In other words, springs 35, 36 move into respective positions in which they exert respective equal, opposite forces F1, F2 on pin 16.

The advantages of damping device 1 according to the present invention will be clear from the above description.

In particular, springs 35, 36 provide, by means of pin 16, for restoring ring 11 quickly and accurately to the first position, as soon as the rotation speed of shaft 2 falls below the critical speeds of shaft 2.

More specifically, springs 35, 36:

slide pin 16, and therefore ring 11, away from bottom wall 7 along axis B; and rotate pin 16, and therefore ring 11, about axis C defined by articulated joint 40.

In other words, springs 35, 36 reduce friction between profile 13 of opening 12 and the outer profile of shaft 2, as soon as the rotation speed of shaft 2 crosses from the second to the first range.

Springs 35, 36 also reduce the response time of device 1 to flexural instability of shaft 2, thus greatly improving the stabilizing effect of device 1.

Ring 11 being made of two detachable half-rings 14, 15 makes device 1 extremely easy to inspect and assemble.

Clearly, changes may be made to damping device 1 as described herein without, however, departing from the scope of the present invention.

The invention claimed is:

1. A damping device for damping flexural vibration of a shaft rotating about a first axis, the device comprising:

a supporting body; and a first member, which defines an annular opening fitted through with said shaft, and is movable, with respect to said supporting body and radially with respect to said first axis, between a first and a second position when said shaft flexes radially with respect to said first axis;

said first member being set to said first position, and said opening being traversed loosely by said shaft when the rotation speed of said shaft is within at least a first range;

said first member being set, in use, to said second position, and the profile of said opening cooperating, in use, with said shaft, when the rotation speed of said shaft is within a second range differing from the first range and comprising at least one critical speed of the shaft;

said device comprising:

first elastic means interposed between said supporting body and said first member; and a pin movable integrally with said first member along a direction which is radial with respect to said first axis;

said first elastic means being interposed between said pin and said supporting body;

characterized by comprising a plate integral with and crosswise to said pin;

said first elastic means comprising:

at least one first spring interposed between a first portion of said supporting body and a projection of said first member; and at least one second spring interposed between said plate and a second portion of said supporting body.

2. A device as claimed in claim 1, characterized in that said first elastic means load said first member into said first position.

3. A device as claimed in claim 2, characterized in that said first spring is loaded to exert a first force and that said second spring is loaded to exert a second force; said first force being equal and opposite to said second force.

4. A device as claimed in claim 1, characterized in that said first member is rotatable with respect to said supporting body about a second axis parallel to said first axis.

5. A device as claimed in claim 4, characterized by comprising a first body having a first surface cooperating with a second surface of a second body fixed with respect to said supporting body;

said first and second surface each being in the shape of a spherical surface portion;

said first body rotating with respect to said second body about said second axis;

and said pin sliding with respect to said first body along a third axis crosswise to said first and second axis, and rotating at least about said second axis with respect to said supporting body.

6. A device as claimed in claim 1, characterized in that said first member comprises a first and second half-member connected releasably to each other.

7. A device as claimed in claim 1, characterized by comprising:

a second member which moves integrally with said first member; and a third member cooperating in sliding manner with said second member and movable integrally with said supporting body.

8. A device as claimed in claim 7, characterized by comprising second elastic means for loading said second member against said third member.

9. A drive comprising:

at least said shaft, which, in use, operates within the second rotation speed range; and a device as claimed in claim 1.

10. An aircraft comprising a drive as claimed in claim 9.

* * * * *